United States Patent
Park et al.

(10) Patent No.: US 10,469,300 B2
(45) Date of Patent: *Nov. 5, 2019

(54) METHOD FOR DETERMINING RESERVED TONES AND TRANSMITTER FOR PERFORMING PAPR REDUCTION USING TONE RESERVATION

(71) Applicant: SAMSUNG ELECTRONICS CO., LTD., Suwon-si (KR)

(72) Inventors: Joo-sung Park, Suwon-si (KR); Young-ho Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/205,720

(22) Filed: Nov. 30, 2018

(65) Prior Publication Data

US 2019/0097855 A1    Mar. 28, 2019

Related U.S. Application Data

(63) Continuation of application No. 15/906,491, filed on Feb. 27, 2018, now Pat. No. 10,164,812, which is a
(Continued)

(30) Foreign Application Priority Data

Feb. 12, 2016    (KR) .................. 10-2016-0016379

(51) Int. Cl.
*H04L 27/00*    (2006.01)
*H04L 27/26*    (2006.01)
(Continued)

(52) U.S. Cl.
CPC ............ *H04L 27/262* (2013.01); *H04B 1/04* (2013.01); *H04B 17/10* (2015.01); *H04L 5/0005* (2013.01);
(Continued)

(58) Field of Classification Search
CPC .. H04L 27/2618; H04L 27/262; H04L 5/0048
See application file for complete search history.

(56) References Cited

U.S. PATENT DOCUMENTS

| | | | |
|---|---|---|---|
| 2005/0089109 A1* | 4/2005 | Yun ................... | H04L 27/2618 375/260 |
| 2007/0242598 A1* | 10/2007 | Kowalski ............ | H04L 27/2618 370/206 |

(Continued)

FOREIGN PATENT DOCUMENTS

| | | |
|---|---|---|
| EP | 1838062 A1 | 9/2007 |
| WO | 2014177839 A1 | 11/2014 |

OTHER PUBLICATIONS

Search report dated Aug. 24, 2016 issued by the International Searching Authority in counterpart International Application No. PCT/KR2016/006143 (PCT/ISA/210).
(Continued)

*Primary Examiner* — David S Huang
(74) *Attorney, Agent, or Firm* — Sughrue Mion, PLLC

(57) ABSTRACT

A method of determining reserved tones to be used for reduction of a peak to average power ratio (PAPR) of a signal includes: randomly selecting carrier indices for the reserved tones and generating a kernel signal based on the randomly selected carrier indices; calculating a comparison reference average value of the kernel signal, comparing the calculated comparison reference average value with a pre-stored comparison reference average value, and preliminarily determining carrier indices of the reserved tones based on the comparison; randomly re-arranging an order of the preliminarily determined carrier indices of the reserved tones; and calculating the comparison reference average value while changing each of the re-arranged indices of the reserved tones, and finally determining carrier indices for
(Continued)

which the calculated comparison reference average value becomes the smallest value as carrier indices of the reserved tones.

16 Claims, 13 Drawing Sheets

Related U.S. Application Data continuation of application No. 15/177,522, filed on Jun. 9, 2016, now Pat. No. 9,935,808.

(60) Provisional application No. 62/209,402, filed on Aug. 25, 2015, provisional application No. 62/172,851, filed on Jun. 9, 2015.

(51) Int. Cl.
  *H04B 17/10* (2015.01)
  *H04B 1/04* (2006.01)
  *H04L 5/00* (2006.01)

(52) U.S. Cl.
  CPC ........ *H04L 5/0007* (2013.01); *H04L 27/2618* (2013.01); *H04L 27/2628* (2013.01); *H04L 5/0048* (2013.01)

(56) References Cited

U.S. PATENT DOCUMENTS

| | | |
|---|---|---|
| 2008/0298490 A1 | 12/2008 | Yun et al. |
| 2009/0103639 A1 | 4/2009 | Sankabathula et al. |
| 2009/0268604 A1 | 10/2009 | Yun et al. |
| 2010/0166105 A1 | 7/2010 | Wu et al. |
| 2014/0016721 A1* | 1/2014 | Xin et al. ................ H04L 1/007 375/295 |
| 2014/0092893 A1 | 4/2014 | Wang |
| 2014/0169188 A1 | 6/2014 | Arambepola et al. |

OTHER PUBLICATIONS

Written Opinion dated Aug. 24, 2016 issued by the International Searching Authority in counterpart International Application No. PCT/KR2016/006143 (PCT/ISA/237).

Lim et al. "Near Optimal PRT Set Selection Algorithm for Tone Reservation in OFDM systems". IEEE Transactions on Broadcasting, vol. 54, No. 3, Sep. 2008.

Communication dated Apr. 25, 2018, issued by the Australian Patent Office in counterpart Australian Application No. 2016275232.

\* cited by examiner

Impulse Response of Kernel Signal

METHOD FOR DETERMINING RESERVED TONES AND TRANSMITTER FOR PERFORMING PAPR REDUCTION USING TONE RESERVATION

CROSS-REFERENCE TO THE RELATED APPLICATIONS

This is a continuation of U.S. application Ser. No. 15/906,491 filed Feb. 27, 2018, which is a continuation of U.S. application Ser. No. 15/177,522 filed Jun. 9, 2016, which claims priority from U.S. Provisional Application No. 62/172,851 filed on Jun. 9, 2015 and U.S. Provisional Application No. 62/209,402 filed on Aug. 25, 2015, and Korean Patent Application No. 10-2016-0016379 filed on Feb. 12, 2016, the disclosures of which are incorporated herein by reference in their entirety.

BACKGROUND

1. Field

Apparatuses and methods consistent with the exemplary embodiments of the inventive concept relate to a method of determining reserved tones and a transmitter performing peak to average power ratio (PAPR) reduction using tone reservation, and more particularly, to a transmitter determining carrier indices reserved for PAPR reduction and performing PAPR reduction using tone reservation.

2. Description of the Related Art

Recently, broadcast and communication services become multi-functional and wideband high quality. Also, in accordance with the development of electronic technologies, various broadcast receiving devices such as a high-definition digital television, a high specification smartphone, and the like have been introduced and increasingly used. As a result, the demand on various receiving methods and various service supports for broadcast services has been increased.

Meanwhile, many transmitting and receiving systems provide broadcast services through an Orthogonal Frequency Division Multiplexing (OFDM) scheme. Since the OFDM scheme performs data transmission using a plurality of carriers (or sub-carriers) in a predetermined frequency band, it may transmit data at high speed and has characteristics that it is strong against multipath fading.

However, in the OFDM scheme, a transmission signal occasionally has a large peak-to-average power ratio (PAPR). Data is transmitted through multi-carriers by performing Inverse Fast Fourier Transform (IFFT) on a signal of a frequency domain. Here, a size of an amplitude of an OFDM signal may be represented by a sum of amplitudes of the multi-carriers. Therefore, in the case where phases of the multi-carriers are the same, an OFDM signal having a high maximum value is generated, which represents a very high PAPR.

An OFDM signal having a very high PAPR deteriorates efficiency of a high power amplifier and the high power amplifier is operated in a non-linear region out of a linear operation range thereof, and thus, the OFDM signal is distorted. Accordingly, there is a problem that performance of a transmission and/or reception system is degraded. As a result, research into a method for reducing the PAPR is requested.

SUMMARY

Exemplary embodiments of the inventive concept may overcome the above problem and other disadvantages not described above. However, the exemplary embodiments are not required to overcome the disadvantages described above, and may not overcome the above problem described above.

The exemplary embodiments provide a method of determining carrier indices reserved for PAPR reduction, and also provide a transmitter of performing the PAPR reduction using the reserved carrier indices.

According to an exemplary embodiment, there is provided a method of determining reserved tones to be used for reduction of a peak to average power ratio (PAPR) of a signal. The method may include: randomly selecting carrier indices for the reserved tones and generating a kernel signal based on the randomly selected carrier indices; calculating a comparison reference average value of the kernel signal, comparing the calculated comparison reference average value with a prestored comparison reference average value, and preliminarily determining carrier indices of the reserved tones based on the comparison; randomly re-arranging an order of the preliminarily determined carrier indices of the reserved tones; and calculating the comparison reference average value while changing each of the re-arranged indices of the reserved tones, and finally determining carrier indices for which the calculated comparison reference average value becomes the smallest value as carrier indices of the reserved tones.

In the generating the kernel signal based on the randomly selected carrier indices for the reserved tones, the kernel signal may be generated by randomly selecting carrier indices for the reserved tones among carrier indices other than carrier indices into which a pilot is inserted, inserting one (1) into carriers of the randomly selected carrier indices, and performing IFFT on the carriers into which one (1) is inserted.

The comparison reference average value of the kernel signal may be an average value of amplitudes of peak signals satisfying a predetermined condition, except a peak signal having the greatest amplitude, among the plurality of peak signals of the kernel signal.

The predetermined condition may be a condition that the peak signals belong to a predetermined top range of amplitude except the peak signal having the greatest amplitude and another predetermined top range of amplitude based on an amplitude of a peak signal having the second-largest amplitude, among the plurality of peak signals of the kernel signal.

In the preliminarily determining the carrier indices of the reserved tones, a smaller comparison reference average value among the calculated comparison reference average value and the prestored comparison reference average value may be compared with a preset value, and carrier indices for a kernel signal having the smaller comparison reference average value which is smaller than the preset value is preliminarily determined as the indices of the reserved tones.

The comparison reference average values may be calculated by sequentially changing respective carrier indices included in the re-arranged carrier indices of the reserved tones to other carrier indices where a pilot is not positioned and the preliminarily determined reserved tones are not positioned.

According to an exemplary embodiment, there is provided a transmitter which may include: a frame generator configured to generate a frame including a plurality of OFDM symbols having a Fast Fourier Transform (FFT) size of 32K; a pilot inserter configured to insert a pilot into first carriers of the plurality of OFDM symbols, respectively; and a PAPR reducer configured to insert a signal for reducing a PAPR into second carriers reserved in at least one of the plurality of OFDM symbols into which the pilot is inserted, wherein the second carriers have carrier indices defined as in Table 4.

The frame may include a preamble symbol, subframe boundary symbols, and data symbols.

The second carriers may have the carrier indices defined in Table 4, when a position in the preamble symbol into which a preamble pilot is to be inserted and a position in the subframe boundary symbols into which a subframe boundary pilot is to be inserted are defined based on a pilot insertion pattern (Dx=6, 8, 12, 16, 24, 32), and an edge pilot is to be inserted into a first carrier and a last carrier in each of the subframe boundary symbols, and Dx is a difference of carrier indices between adjacent carriers into which the pilot is to be inserted.

The second carriers may have the carrier indices defined as in Table 4, when a position in the data symbols into which a scattered pilot is to be inserted is defined based on a pilot insertion pattern (Dx=3, 4, 6, 8, 12, 16, 24, 32 and Dy=2, 4) and an edge pilot is to be inserted into a first carrier and a last carrier in each of the data symbols, and Dx is a difference of carrier indices between adjacent carriers into which the pilot is to be inserted, and Dy is a difference of symbol indices between successive pilots on a specific carrier.

According to an exemplary embodiment, there is provided a transmitter which may include: a frame generator configured to generate a frame including a plurality of OFDM symbols having a Fast Fourier Transform (FFT) size of 32K; a pilot inserter configured to insert a pilot into first carriers of the plurality of OFDM symbols, respectively; and a PAPR reducer configured to insert a signal for reducing a PAPR into second carriers reserved in at least one of the plurality of OFDM symbols into which the pilot is inserted, wherein the second carriers have carrier indices defined as in Table 5.

The frame may include a preamble symbol, subframe boundary symbols, and data symbols.

The second carriers may have the carrier indices defined as in Table 5, when a position in the preamble symbol into which a preamble pilot is to be inserted and a position in the subframe boundary symbols into which a subframe boundary pilot is to be inserted are defined based on Dx=3, 4, and an edge pilot is to be inserted into a first carrier and a last carrier in each of the subframe boundary symbols, and Dx is a difference of carrier indices between adjacent carriers into which the pilot is to be inserted.

According to various exemplary embodiments, when PAPR reduction is performed, it is possible to prevent a new peak from occurring, thereby more efficiently reducing a PAPR.

BRIEF DESCRIPTION OF THE DRAWING FIGURES

The above and/or other aspects of the exemplary embodiments will be more apparent by describing certain exemplary embodiments of the inventive concept with reference to the accompanying drawings, in which.

DETAILED DESCRIPTION OF THE EXEMPLARY EMBODIMENTS

Hereinafter, the exemplary embodiments of the inventive concept will be described in more detail with reference to the accompanying drawings.

The exemplary embodiments relate to a method for reducing a PAPR using a tone reservation (TR) scheme, in a system in which a signal is transmitted by an OFDM scheme. Particularly, according to the exemplary embodiments, in order to efficiently reduce a PAPR while avoiding collision with pilots by considering positions of carriers in which the pilots exist in an OFDM symbol, carriers of specific positions are used as reserved tones.

First, a method for reducing a PAPR according to a tone reservation method is as follows. In the tone reservation method, tones are reserved for some of carriers. Here, the reserved tones do not transmit data and are used to reduce a PAPR. In this case, since a receiver neglects the reserved tones which do not transmit data and restores the data only from a signal at a tone position of data, there is an advantage that a structure of the receiver is simple.

Meanwhile, in the tone reservation method, a gradient algorithm is used to reduce a peak. Hereinafter, a method for reducing a peak using the gradient algorithm will be described in more detail with reference to FIG. 1.

Figure 1:
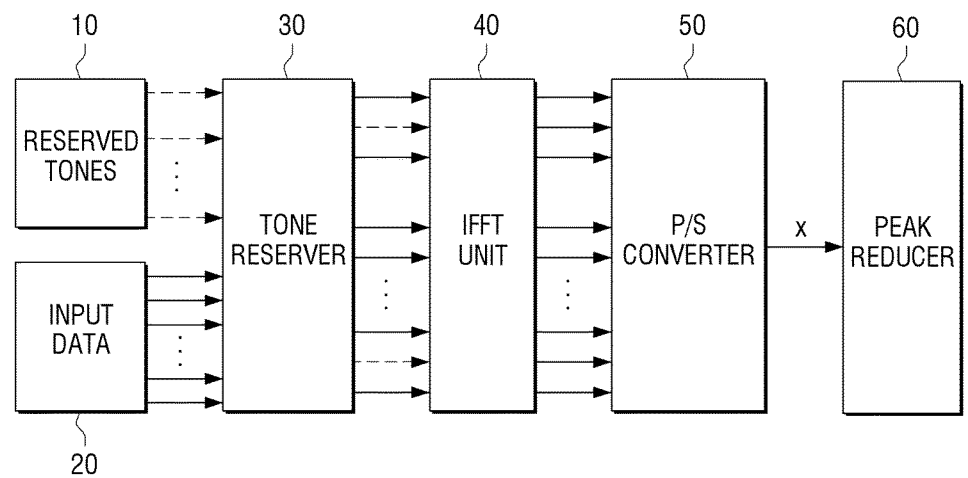
FIG. 1 is a diagram illustrating a method for reducing PAPR according to an exemplary embodiment.

FIG. 1 illustrates a configuration diagram of a transmitter which reduces a PAPR using the tone reservation method.

Referring to FIG. 1, reserved tones 10 and data (i.e., broadcast data, an L1 signaling including signaling information about the broadcast data, pilots, etc.) 20 are input to a tone reserver 30, and a tone reservation signal is allocated by the tone reserver 30 to a predetermined carrier position known between a transmitter and a receiver by the tone reserver 30.

Meanwhile, if a sum of the reserved tones 10 and the input data 20 is input to an Inverse Fast Fourier Transform (IFFT) unit 40, IFFT is performed, and thereafter, an output signal x of a time domain is generated by a parallel/serial (P/S) converter 50. In this case, a peak reducer 60 reduces a PAPR of the output signal x.

The peak reducer 60 generates a kernel signal having impulse characteristics using the reserved tones. Here, the kernel signal is used to clip the output signal x.

Specifically, the peak reducer 60 detects a peak of the output signal x. That is, the peak reducer 60 detects a position, an amplitude, and a phase of the peak of the output signal x. In addition, in order to reduce the peak of the output signal x, the peak reducer 60 performs at least one of circular shifting, scaling, and phase rotation on the kernel signal based on the position, the amplitude, and the phase of the peak of the output signal x, and then adds the results to the output signal x.

Thereafter, the peak reducer 60 calculates the PAPR of the output signal x having a reduced peak. In addition, if the calculated PAPR does not meet a target (or a desired) PAPR level, the peak reducer 60 may repeat the above-mentioned process until the PAPR for the output signal x meets the target PAPR level, or may repeat the above-mentioned process as many as the number of times (e.g., N) predefined by a system.

Figure 2:
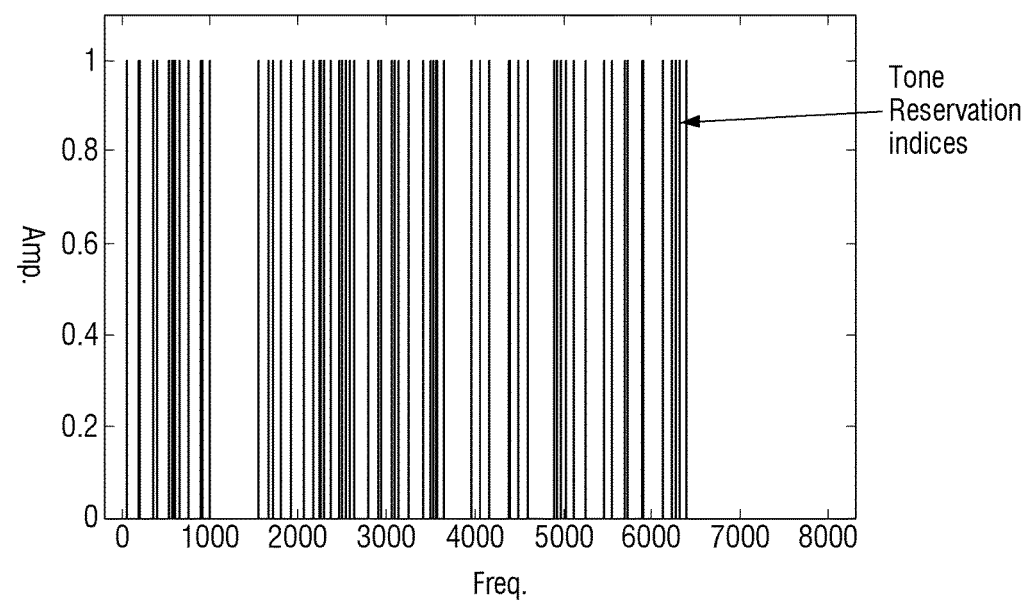
FIG. 2 is a diagram illustrating a problem that is able to occur when PAPR is reduced, according to an exemplary embodiment.
Figure 2:
Figure 2:
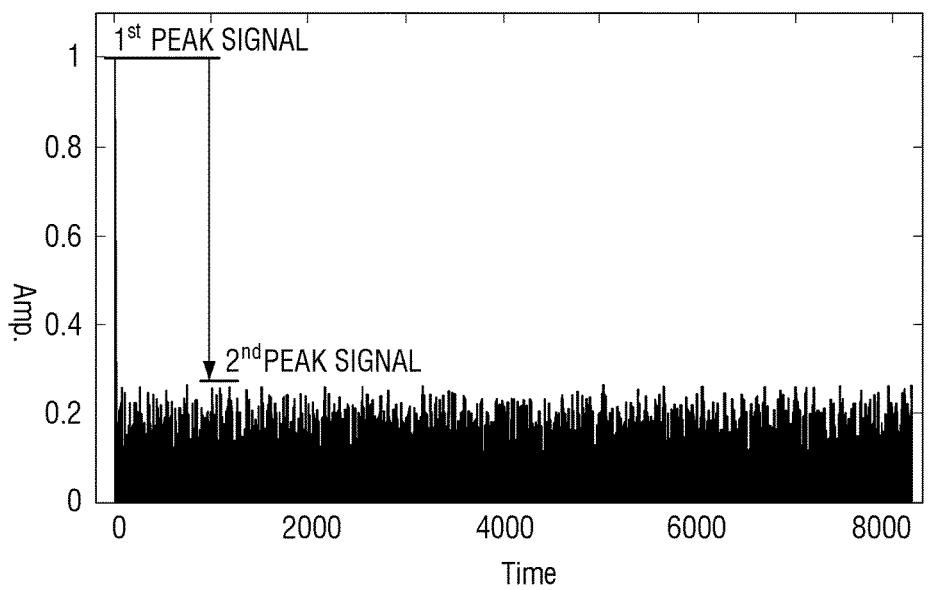

As such, according to a tone reservation method, the peak of a data signal is reduced by adding the kernel signal to the data signal. However, as the kernel signal is added to the data signal, a new peak may also occur in the data signal. Here, the data signal may be an OFDM signal For example, as illustrated in FIG. 2, when IFFT is performed in a frequency domain after 1 (one) is inserted into carriers to which reserved tones are allocated, a kernel signal having a peak at a particular time point in a time domain may be generated.

In this case, if the kernel signal is added to the data signal, a peak of the data signal may be reduced by a first peak, i.e., the greatest peak of amplitude, of the kernel signal. However, since other portions except the first peak are added to the data signal, when amplitudes of the other peaks except the first peak are large, a new peak may occur in the data signal by the other peaks.

Therefore, according to an exemplary embodiment, the positions of reserved tones (i.e., carrier indices used for the reserved tones) which may minimize the amplitudes of the other peaks of the kernel signal except the first peak of the kernel signal are determined, and these carrier indices are used as the reserved tones in order to reduce a PAPR of the data signal.

Hereinafter, a method of determining carrier indices in which tones are reserved according to an exemplary embodiment will be described.

First, according to an exemplary embodiment, since a signal is transmitted through a frame defined in an Advanced Television System Committee (ATSC) 3.0 standard, a frame structure defined in the ATSC 3.0 standard will be described with reference to FIG. 3.

Figure 3:
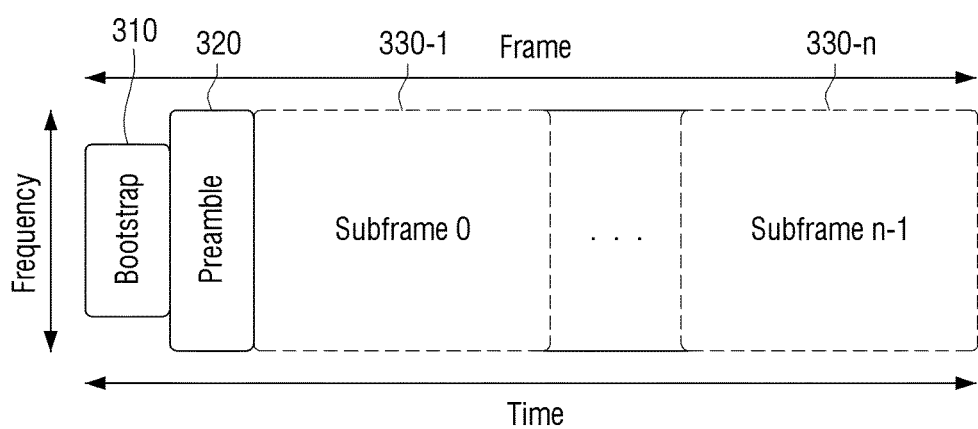
FIG. 3 is a diagram illustrating a frame structure according to an exemplary embodiment.
Figure 4:
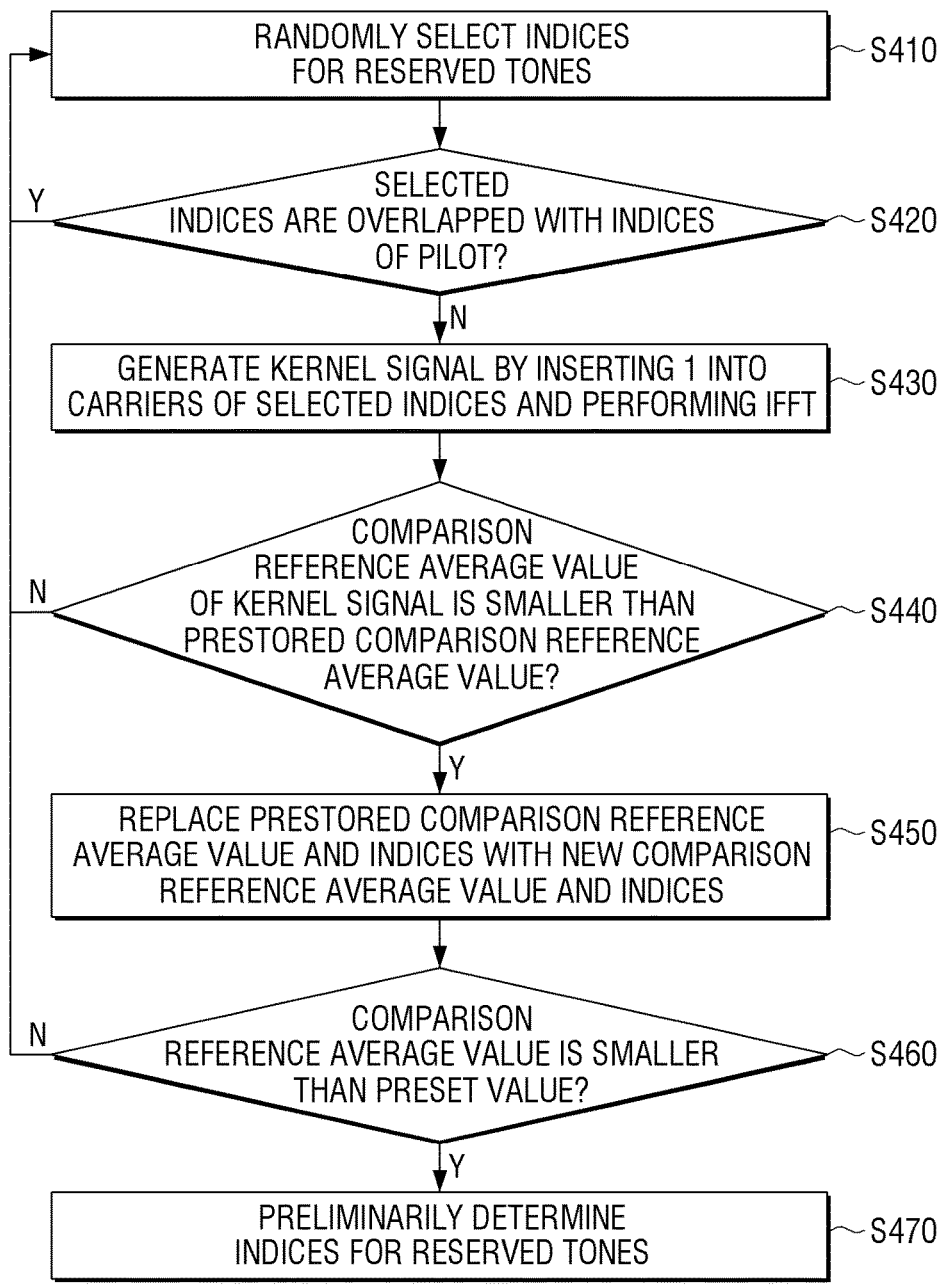
FIGS. 4 to 9 are diagrams illustrating a method for determining reserved tones according to an exemplary embodiment.

According to the ATSC 3.0 standard, as illustrated in FIG. 3, the frame includes a bootstrap 310, a preamble 320, and one or more subframes 330-1, . . . , 330-n.

Specifically, the bootstrap 310 is positioned at a start of each frame, the preamble 320 is positioned following the bootstrap 310, and the one or more subframes 330-1, . . . , 330-n are positioned following the preamble 320.

The bootstrap 310, the preamble 320, and the one or more subframes 330-1, . . . , 330-n comprise one or more OFDM symbols, and the number of carriers for each OFDM symbol may be determined depending on an FFT mode (i.e., in an FFT size, the FFT size may be 32K).

Meanwhile, each subframe may include subframe boundary symbols and data symbols. The subframe boundary symbols are positioned at boundaries with other subframes, and the data symbols are positioned between the subframe boundary symbols. That is, a first OFDM symbol and the last OFDM symbol among the OFDM symbols configuring each subframe are the subframe boundary symbols, and the remaining OFDM symbols other than the subframe boundary symbols are the data symbols.

Meanwhile, according to the ATSC 3.0 standard, pilots are inserted into the preamble and the subframes for channel estimation and synchronization.

Types of pilots inserted into the preamble and the subframes are as illustrated in the following Table 1.

TABLE 1

| Symbol Type | Preamble Pilot | Scattered Pilot | Subframe Boundary Pilot | Continual Pilot | Edge Pilot |
|---|---|---|---|---|---|
| Preamble | ✓ | | | ✓ | |
| Data | | ✓ | | ✓ | ✓ |
| Subframe Boundary | | | ✓ | ✓ | ✓ |

Referring to Table 1, a preamble pilot is inserted into the preamble, a scattered pilot (SP) is inserted into the data symbol, and a subframe boundary pilot is inserted into the subframe boundary symbol. In addition, a continual pilot (CP) is inserted into the preamble symbol, the data symbol, and the subframe boundary symbol, and an edge pilot is inserted into the data symbol and the subframe boundary symbol.

Meanwhile, a position into which a pilot is to be inserted may be defined by an index of a carrier into which the pilot is to be inserted, or may be determined based on specific pilot patterns (e.g., Dx and Dy). Here, Dx means a difference in carrier index between adjacent carriers into which a pilot is to be inserted, in a frequency direction (in regard to this, in ATSC 3.0, defined as separation of pilot bearing carriers (that is, in the frequency direction), and in Digital Video Broadcasting-Terrestrial Version 2 (DVB-T2), defined as difference in carrier index between adjacent scattered-pilot-bearing carriers), and Dy means a difference of the number of symbols between successive pilots on a specific carrier, in a time direction (in regard to this, in ATSC 3.0, defined as number of symbols forming one scattered pilot sequence (time direction), and in DVB-T2, defined as a difference in symbol number between successive scattered pilots on a given carrier).

First, the position into which the preamble pilot is to be inserted may be determined based on Dx. In the case of preamble pilot, since Dy is 1 (Dy=1), the preamble pilot is inserted to the same position of every preamble symbol. Specifically, the preamble pilot may be inserted into cells (i.e., carriers) having a carrier index k satisfying k mod Dx=0 in the preamble symbol. Here, Dx may be 3, 4, 6, 8, 12, 16, 24, and 32, and the system may select one of these values depending on a channel environment.

The position into which the scattered pilot is to be inserted may be determined based on Dx and Dy. Specifically, the scattered pilot may be inserted into a carrier having an index k in a first OFDM symbol satisfying following mathematical expression 1.

$$k \bmod (D_X D_Y) = D_X (l \bmod D_Y) \quad (1)$$

Here, Dx and Dy may be defined as illustrated in following Table 2, and SPa_b means a pilot pattern, which a is Dx (a=Dx) and b is Dy (b=Dy).

TABLE 2

| Pilot Pattern | $D_X$ | $D_Y$ |
|---|---|---|
| SP3_2 | 3 | 2 |
| SP3_4 | 3 | 4 |
| SP4_2 | 4 | 2 |
| SP4_4 | 4 | 4 |
| SP6_2 | 6 | 2 |
| SP6_4 | 6 | 4 |
| SP8_2 | 8 | 2 |
| SP8_4 | 8 | 4 |
| SP12_2 | 12 | 2 |
| SP12_4 | 12 | 4 |
| SP16_2 | 16 | 2 |

TABLE 2-continued

| Pilot Pattern | $D_X$ | $D_Y$ |
|---|---|---|
| SP16_4 | 16 | 4 |
| SP24_2 | 24 | 2 |
| SP24_4 | 24 | 4 |
| SP32_2 | 32 | 2 |
| SP32_4 | 32 | 4 |

Meanwhile, the system may select one of SPa_b defined in Table 2 depending on the channel environment.

A position into which a subframe boundary pilot is to be inserted may be determined based on Dx. Specifically, the subframe boundary pilot may be inserted into cells having a carrier index k satisfying k mod Dx=0 in the subframe boundary symbol (except when k=0 and k=NoC−1). Cells in the subframe boundary symbol for which k=0 or k=NoC−1 shall be edge pilots. Here, Dx may be 3, 4, 6, 8, 12, 16, 24, and 32, and the system may select one of these values depending on a channel environment. However, an edge pilot is inserted into a first carrier and a last carrier of subframe boundary symbols, respectively.

A position into which a continual pilot is to be inserted is defined by an index itself of carriers into which the continual pilot is inserted.

Specifically, the continual pilot may be inserted into different positions depending on an FFT size, and in an FFT size of 32K, an index of carriers into which the continual pilot is to be inserted may be defined as illustrated in following Table 3.

TABLE 3

236 316 356 412 668 716 868 1100 1228 1268 1340 1396 1876 1916
2140 2236 2548 2644 2716 2860 3004 3164 3236 3436 3460 3700
3836 4028 4124 4132 4156 4316 4636 5012 5132 5140 5332 5372
5500 5524 5788 6004 6020 6092 6428 6452 6500 6740 7244 7316
7372 7444 7772 7844 7924 8020 8164 8308 8332 8348 8788 8804
9116 9140 9292 9412 9436 9604 10076 10204 10340 10348 10420
10660 10684 10708 11068 11132 11228 11356 11852 11860 11884
12044 12116 12164 12268 12316 12700 12772 12820 12988 13300
13340 13564 13780 13868 14084 14308 14348 14660 14828 14876
14948 15332 15380 15484 15532 15604 15764 15788 15796 16292
16420 16516 16580 16940 16964 16988 17228 17300 17308 17444
17572 18044 18212 18236 18356 18508 18532 18844 18860 19300
19316 19340 19484 19628 19724 19804 19876 20204 20276 20332
20404 20908 21148 21196 21220 21556 21628 21644 21860 22124
22148 22276 22316 22508 22516 22636 23012 23332 23492 23516
23524 23620 23812 23948 24188 24212 24412 24484 24644 24788
24932 25004 25100 25412 25508 25732 25772 26252 26308 26380
26420 26548 26780 26932 26980 27236 27292 27332 27412

Accordingly, in a case where the FFT size is 32K, the system may insert the continual pilot based on Table 3.

An edge pilot may be inserted into a first carrier and a last carrier of the symbols other than the preamble symbol, that is, a first carrier and a last carrier of OFDM symbols configuring a data symbols and subframe boundary symbols.

Meanwhile, carrier indices can be considered to be either absolute carrier indices or relative carrier indices. Absolute carrier indices are indexed on the maximum possible number of carriers regardless of whether carrier reduction has been configured and hence range from 0 (i.e. an index of a first carrier) to $NoC_{max}-1$ (i.e. an index of a last carrier) (Here, $NoC_{max}$=27649). Relative carrier indices are indexed on the configured number of carriers and hence range from 0 (i.e. an index of a first carrier) to NoC−1 (i.e. an index of a last carrier)(Here, NoC=27649, 27265, 26881, 26497 or 26113). Preamble, scattered, subframe boundary, and edge pilot locations depend on the relative carrier indices. Continual pilot locations depend on the absolute carrier indices.

Meanwhile, in the case where at least one pilot is inserted as described above, a method for determining reserved tones according to an exemplary embodiment will be described with reference to FIGS. 4 to 9.

First, indices for reserved tones are randomly selected. Here, the indices for the reserved tones represent carrier indices to be allocated to the reserved tones. Meanwhile, the number of carriers $N_{TR}$ allocated to the reserved tones may have different values depending on an FFT size. For example, in the case where an FFT size is 32K, $N_{TR}$ is 288 ($N_{TR}$=288).

Specifically, carrier indices for reserved tones are randomly selected from among indices other than indices of carriers into which a pilot is inserted.

That is, the indices for the reserved tones are randomly selected (S410), and it is determined whether o the selected indices overlap indices of the pilot (S420), thereby making it possible to randomly select the carrier indices for the reserved tones among the indices other than the indices of the carriers into which the pilot is inserted.

Here, the pilot may include a preamble pilot, a scattered pilot, a subframe boundary pilot, a continual pilot, and an edge pilot, and the positions into which the respective pilots are inserted are as described above.

Thereafter, a kernel signal is generated based on the randomly selected indices for the reserved tones. Specifically, in a case where the randomly selected indices do not overlap the indices of the pilot (No in S420), the kernel signal may be generated by inserting one (1) into the carriers for the randomly selected indices and performing IFFT, as shown in FIG. 2 (S430).

In addition, a comparison reference average value of amplitudes of the kernel signal is calculated, the calculated comparison reference average value is compared with a prestored comparison reference average value, and the indices of the reserved tones are preliminarily determined based on the comparison.

Specifically, if the calculated comparison reference average value of the kernel signal is smaller than the prestored comparison reference average value (Yes in S440), the prestored comparison reference average value is replaced with the calculated comparison reference average value (S450). Here, the prestored comparison reference average value may be a comparison reference average value which is calculated and stored based on randomly selected indices for the reserved tones, before performing the above-mentioned processes. In this case, the randomly selected indices for the reserved tones may also be stored, and in S450, prestored indices may also be updated.

In addition, if the comparison reference average value of the kernel signal is smaller than a preset value (Yes in S460), the indices which form the basis of the calculation of the comparison reference average value may be preliminarily determined as indices of the reserved tones to be used for PAPR reduction (S470).

That is, a smaller comparison reference average value among the calculated comparison reference average value and the prestored comparison reference average value is compared with the preset value, and as a result of the comparison, if the comparison reference average value is smaller than the preset value, indices which form the basis of the generation of the kernel signal having the comparison reference average value are preliminarily determined as the indices of the reserved tones.

However, if the calculated comparison reference average value of the kernel signal is not smaller than the prestored comparison reference average value, the indices of the reserved tones may be preliminarily determined by repeating the above-mentioned process until the calculated comparison reference average value becomes smaller than the prestored comparison reference average value, and determining whether the calculated comparison reference average value is smaller than the preset value.

In addition, after the prestored comparison reference average value is replaced with the calculated comparison reference average value, if the comparison reference average value is greater than or equal to the preset value, the indices for the reserved tones may be preliminarily determined by repeating the above-mentioned process until the comparison reference average value becomes smaller than the preset value.

According to an exemplary embodiment, the comparison reference average value of the kernel signal is an average value of amplitudes of peak signals which satisfy a predetermined condition, except a peak signal having the greatest amplitude, among a plurality of peak signals of the kernel signal generated based on the randomly selected indices for the reserved tones.

According to an exemplary embodiment, the predetermined condition may be a condition that the peak signals, except the peak signal having the greatest amplitude of the kernel signal generated based on the randomly selected indices for the reserved tones, belong to a predetermined amplitude range (for example, within top 10%), and belong to another predetermined amplitude range (for example, within top 20%) based on amplitude of a peak signal having the second-largest amplitude. However, the above-mentioned numerical values are merely examples.

Hereinafter, a method of calculating a comparison reference average value will be described in more detail with reference to FIGS. 5 to 8.

Figure 5:
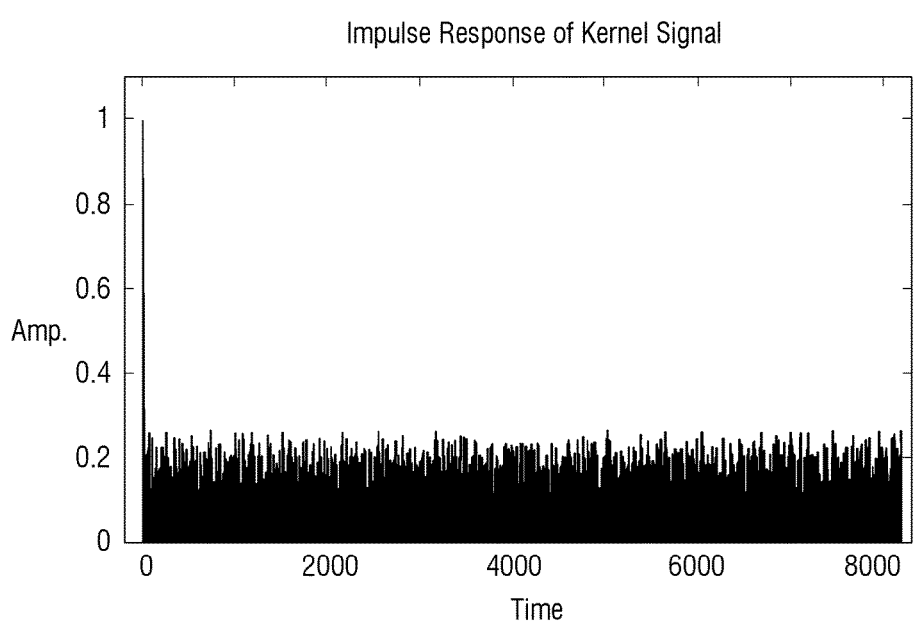

First, it is assumed that a kernel signal generated based on randomly selected indices for reserved tones is as illustrated in FIG. 5. Referring to FIG. 5, the kernel signal comprises a plurality of peak signals having various amplitudes in a time domain. In this case, the plurality of peak signals of the kernel signal are classified depending on amplitudes, and a histogram illustrating the number of peak signals according to the amplitudes may be illustrated as in FIG. 6.

Figure 6:
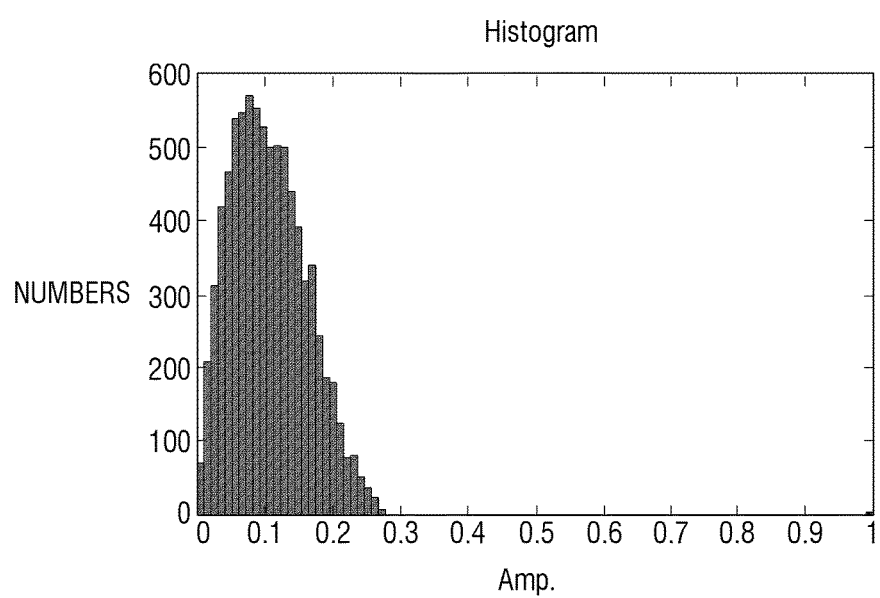

Thereafter, a comparison reference average value of a kernel signal may be calculated based on the histogram as illustrated in FIG. 6.

Figure 7:
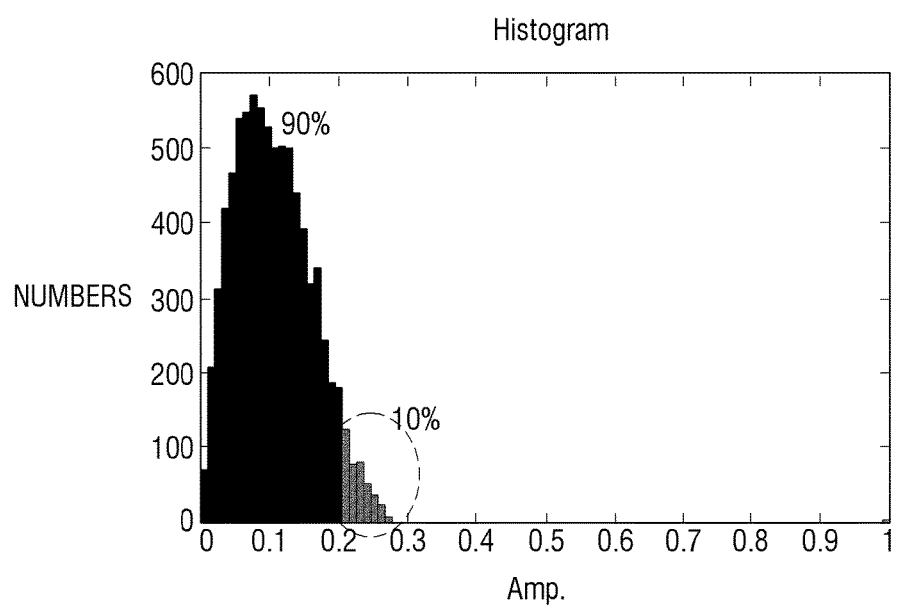
Figure 8:
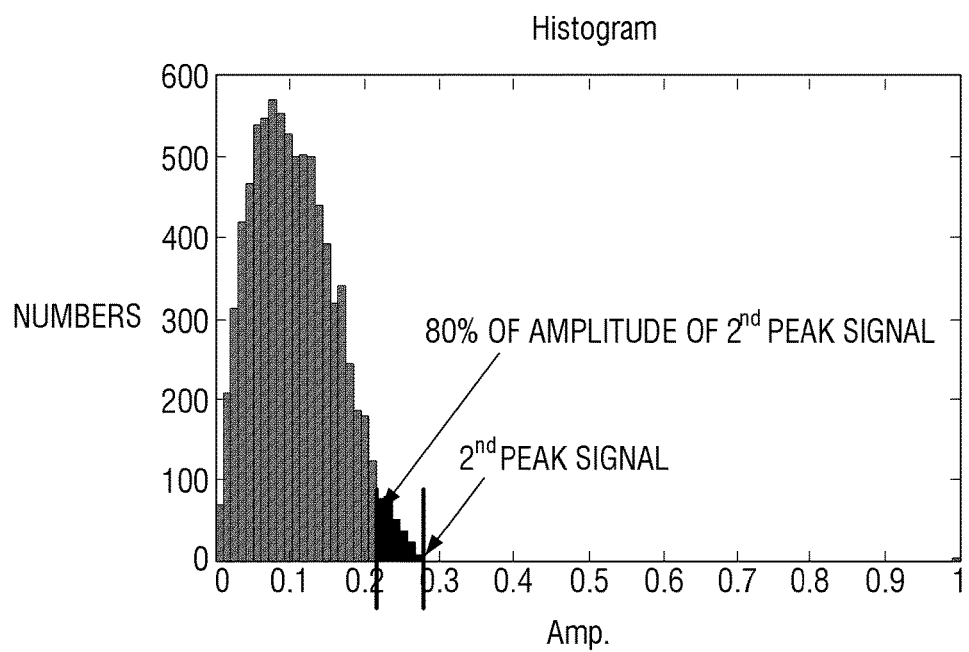
Figure 9:
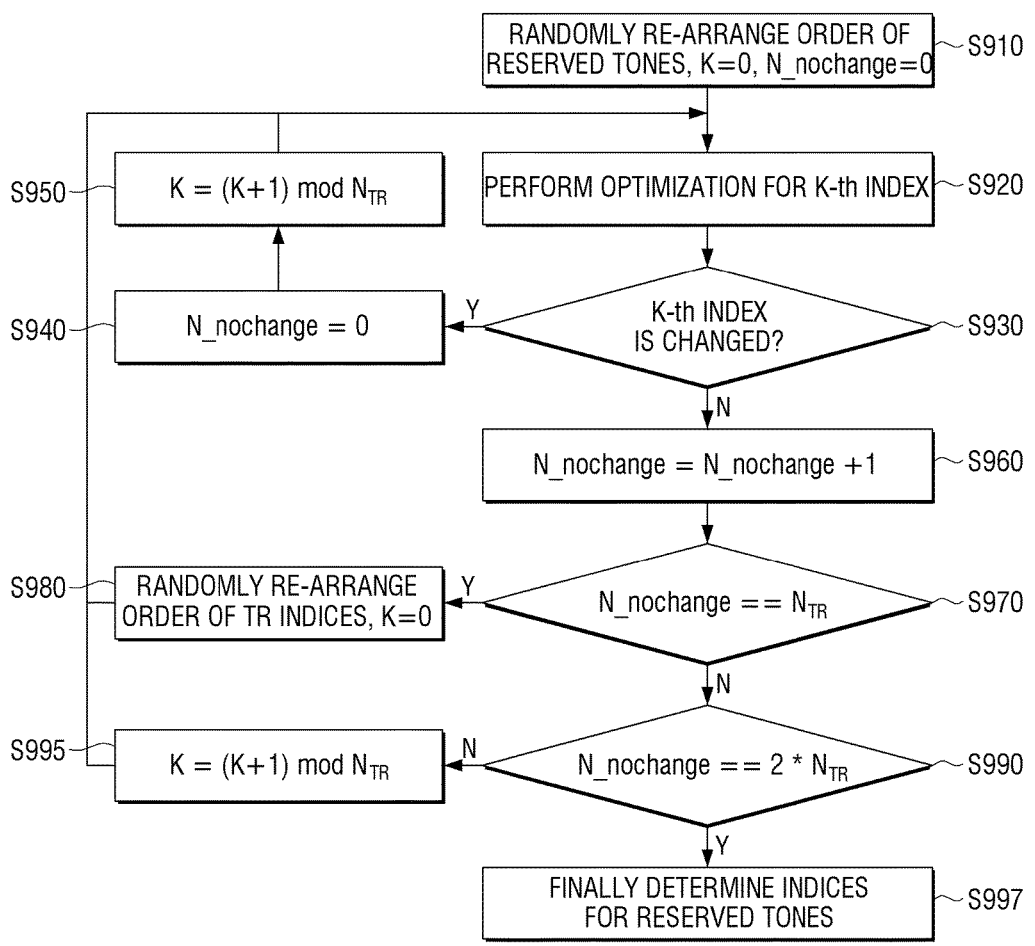

Specifically, as illustrated in FIG. 7, a first group of peak signals which belong to within top 10% in order of amplitude among peak signals other than a peak signal having the greatest amplitude (i.e., a first peak signal) is determined using the histogram. In addition, as illustrated in FIG. 8, a second group of peak signals having an amplitude of 80% or more of the amplitude of a peak signal which is the second-largest amplitude (i.e., a second peak signal) is determined using the histogram.

In addition, peak signals which commonly belong to the first and second groups are determined by comparing the peak signals that belong to the first group and the second group, respectively, and an average value of amplitudes of the peak signals which commonly belong to the first and second groups is calculated. The calculated value as described above is a comparison reference average value for the randomly selected indices for the reserved tones.

As such, according to the present exemplary embodiment, the comparison reference average value is calculated using the peak signals having the amplitude of a specific percentage or more based on the amplitude of the second peak signal while belonging to within a specific range in order of amplitude, among the peak signals, and if the comparison reference average value is smaller than the preset value, the indices which form the basis of the calculation of the comparison reference average value is preliminarily determined as the indices of the reserved tones.

Here, the preset value, which is a value obtained by simulation, may be set to a value which may prevent an occurrence of a new peak by the peak signals other than the first peak signal among the plurality of peak signals configuring the kernel signal, particularly, the peak signals having a specific amplitude or more including the second peak signal, when the kernel signal is added to a data signal in order to reduce a PAPR.

Meanwhile, if the carrier indices of the reserved tones are preliminarily determined, carrier indices for the reserved tones may be finally determined using the preliminarily determined carrier indices. A detailed description thereof will be provided with reference to FIG. 9.

First, an order of the preliminarily determined indices of the reserved tones is randomly re-arranged (S910). In this case, K may be set to zero (K=0) and N_nochange may be set to zero (N_nochange=0).

For example, in a case where the preliminarily determined indices of the reserved tones are '1, 4, 8, and 9', an order of these indices may be randomly re-arranged such as '8, 1, 9, and 4'.

In addition, the randomly re-arranged indices are changed to other indices, and kernel signals are generated based on the changed indices. Further, comparison reference average values of the kernel signals are calculated and compared to one another, and as a result of the comparison, indices based on which a kernel signal having the smallest comparison reference average value is generated are finally determined as indices of the reserved tones to be used for reduction of the PAPR of the data signal.

Specifically, a comparison reference average value may be calculated while sequentially changing the respective indices included in the randomly re-arranged indices of the reserved tones to indices, among carrier indices, where a pilot is not positioned and the preliminarily determined reserved tones are not positioned, and indices for the smallest comparison reference average value among the calculated comparison reference average values may be finally determined as the indices of the reserved tones to be used for reduction of the PAPR of the data signal.

To this end, first, an optimization for a K-th index among the randomly re-arranged indices of the reserved tones is performed (S920).

Here, the optimization means a process of determining indices which generate the smallest comparison reference average value, when the comparison reference average value is calculated while sequentially changing the K-th index to other indices.

Specifically, the indices which generate the smallest comparison reference average value may be determined by sequentially changing the K-th index among the randomly re-arranged indices of the reserved tones to an index among the carrier indices in which the pilot is not positioned and the preliminarily determined reserved tone is not positioned, and calculating a comparison reference average value whenever the index is changed.

As in the example described above, it is assumed that the indices of the preliminarily determined reserved tones are '1, 4, 8, and 9', and a state in which the indices of the preliminarily determined reserved tones are randomly rearranged is '8, 1, 9, and 4'. Here, it is assumed that the number of carriers for one OFDM symbol is 10, and indices of carriers into which the pilot is inserted are '3 and 7'. However, this is merely an example for convenience of explanation.

Specifically, in the way that K=0, a comparison reference average value may be calculated by sequentially changing an index 8, which is a zero-th index (i.e. a first value among the randomly re-arranged indices '8, 1, 9, and 4') among the randomly re-arranged indices, that is, '8, 1, 9, and 4' to an index other than '3 and 7', which are the indices in which the pilot is positioned, and '1, 9, and 4', which are indices in which other reserved tones are positioned.

That is, in a case where the indices are '0, 1, 9, and 4', a kernel signal may be generated by inserting 1 into carriers of which indices are 0, 1, 9, and 4, and performing IFFT, and a comparison reference average value of the generated kernel signal may be calculated. Similarly, a comparison reference average value may also be calculated for a case where indices are '2, 1, 9, and 4', '5, 1, 9, and 4', '6, 1, 9, and 4', and '8, 1, 9, and 4', respectively.

In addition, the comparison reference average value having the minimum value among the calculated comparison reference average values is determined, and it is determined whether the K-th index among indices when the comparison reference average value has the minimum value is changed (S930). That is, it is determined whether the K-th index when the comparison reference average value has the minimum value is a value different from the existing K-th index.

In the above-mentioned example, in a case where indices when the comparison reference average value has the minimum value are '5, 1, 9, and 4', it may be estimated that the zero-th index based on '8, 1, 9, and 4' is changed from 8 to 5.

As such, if the K-th index is changed (Yes in S930), N_nochange is set to 0 (N_nochange=0) (S940) and K is set to (K+1) mod $N_{TR}$ (K=(K+1) mod $N_{TR}$) (S950), and the above-mentioned process is repeated for a (K+1) mod $N_{TR}$-th index for the indices (i.e., in the above-mentioned example, '5, 1, 9, and 4') in which the K-th index is changed. Here, $N_{TR}$ is the number of carriers used for the reserved tones.

However, in the above-mentioned example, in a case where the indices when the smallest comparison reference average value is generated are '8, 1, 9, and 4', it may be estimated that the zero-th index based on '8, 1, 9, and 4' is not changed.

As such, if the K-th index is not changed (No in S930), N_nochange is set to N_nochange+1 (N_nochange=N_nochange+1) (S960) and it is determined whether N_nochange=$N_{TR}$ is satisfied (S970).

Accordingly, if N_nochange=$N_{TR}$ is satisfied (Yes in S970), it is determined that K=0, an order of indices is randomly re-arranged (S980), and the above-mentioned process is repeated.

However, if N_nochange=$N_{TR}$ is not satisfied (No in S970), it is determined whether N_nochange=2*$N_{TR}$ is satisfied (S990).

Accordingly, if N_nochange=2*$N_{TR}$ is not satisfied (No in S990), K is set to (K+1) mod NTR (K=(K+1) mod $N_{TR}$) (S995), and the above-mentioned process is repeated. However, if N_nochange=2*$N_{TR}$ is satisfied (Yes in S990), indices output from S990 are finally determined as the indices for the reserved tones (S997).

In the case where the indices of the reserved tones are determined according to the method as described above, and a PAPR reduction is performed based on the determined indices of the reserved tones, amplitudes of a second peak signal and peak signals having the next sequentially high amplitude in the kernel signal may be generally reduced. Accordingly, since a difference between the second peak signal and the peak signals having the next sequentially high amplitude in the kernel signal is reduced, when the kernel signal is added to the data signal in order to reduce a PAPR, a new peak may not occur.

Meanwhile, the indices of the reserved tones determined according to the above-mentioned method are as illustrated in following Table 4 and Table 5. That is, Table 4 and Table 5 illustrate a set of carriers reserved for PAPR reduction in a case where an FFT size is 32K.

Specifically, Table 4 illustrates a set of carriers reserved for all symbols except a preamble symbol and subframe boundary symbols in a case where Dx is 3 and Dx is 4. That is, Table 4 illustrates a set of carriers reserved for data symbols, and a preamble symbol and subframe boundary symbols except the case where Dx is 3 and Dx is 4.

Specifically, in a case where positions in data symbols into which a scattered pilot is to be inserted are defined based on a pilot insertion pattern Dx=3, 4, 6, 8, 12, 16, 24, and 32, and Dy=2 and 4, and an edge pilot is to be inserted into a first carrier and a last carrier in each of the data symbols, and in a case where a position in a preamble symbol into which a preamble pilot is to be inserted and a position in subframe boundary symbols into which a subframe boundary pilot is to be inserted are defined based on a pilot insertion pattern Dx=6, 8, 12, 16, 24, and 32, and an edge pilot is to be inserted into a first carrier and a last carrier in each of the subframe boundary symbols, a set of carrier to be reserved for the preamble symbol, the subframe boundary symbols, and the data symbols is as illustrated in Table 4.

Table 5 illustrates a set of carriers reserved for a preamble symbol and subframe boundary symbols in a case in which Dx is 3 and Dx is 4.

Specifically, in a case in which a position in a preamble symbol into which a preamble pilot is to be inserted and a position in subframe boundary symbols into which a subframe boundary pilot is to be inserted are defined based on a pilot insertion pattern (Dx=3 and 4), and an edge pilot is to be inserted into a first carrier and a last carrier in each of the subframe boundary symbols, a set for carriers reserved for the preamble symbol and the subframe boundary symbols is as illustrated in Table 5.

That is, in Table 4 and Table 5, in the case of scattered pilots to be inserted into the data symbols, Dy is 2 and 4.

In addition, in Table 4, in the case of scattered pilots to be inserted into the data symbols, Dx is 3, 4, 6, 8, 12, 16, and 32, and in Table 4, in the case of preamble pilots and subframe boundary pilots to be inserted into the preamble symbol and the subframe boundary symbols, Dx is 6, 8, 12, 16, 24, and 32. In addition, in Table 5, in the case of preamble pilots and subframe boundary pilots to be inserted into the preamble symbol and the subframe boundary symbols, Dx is 3 and 4.

In addition, in Tables 4 and 5, an edge pilot is to be inserted into a first carrier and a last carrier in each of the subframe boundary symbols and the data symbols.

TABLE 4

| FFT Size (Number of Reserved Tones) | Tone Reservation Carrier Indices |
|---|---|
| 32K (288) | 803, 805, 811, 901, 1001, 1027, 1245, 1258, 1318, 1478, 1507, 1509, 1556, 1577, 1655, 1742, 1978, 2001, 2056, 2110, 2164, 2227, 2305, 2356, 2408, 2522, 2563, 2780, 2805, 2879, 3010, 3019, 3128, 3389, 3649, 3730, 3873, 4027, 4066, 4087, 4181, 4246, 4259, 4364, 4406, 4515, 4690, 4773, 4893, 4916, 4941, 4951, 4965, 5165, 5222, 5416, 5638, 5687, 5729, 5930, 5997, 6005, 6161, 6218, 6292, 6344, 6370, 6386, 6505, 6974, 7079, 7114, 7275, 7334, 7665, 7765, 7868, 7917, 7966, 8023, 8055, 8089, 8091, 8191, 8374, 8495, 8651, 8690, 8755, 8821, 9139, 9189, 9274, 9561, 9611, 9692, 9711, 9782, 9873, 9964, 10011, 10209, 10575, 10601, 10623, 10690, 10967, 11045, 11083, 11084, 11090, 11128, 11153, 11530, 11737, 11829, 11903, 11907, 11930, 11942, 12356, 12429, 12484, 12547, 12562, 12605, 12767, 12863, 13019, 13052, 13053, 13167, 13210, 13244, 13259, 13342, 13370, 13384, 13447, 13694, 13918, 14002, 14077, 14111, 14216, 14243, 14270, 14450, 14451, 14456, 14479, 14653, 14692, 14827, 14865, 14871, 14908, 15215, 15227, 15284, 15313, 15333, 15537, 15643, 15754, 15789, 16065, 16209, 16213, 16217, 16259, 16367, 16369, 16646, 16780, 16906, 16946, 17012, 17167, 17192, 17325, 17414, 17629, 17687, 17746, 17788, 17833, 17885, 17913, 18067, 18089, 18316, 18337, 18370, 18376, 18440, 18550, 18680, 18910, 18937, 19047, 19052, 19117, 19383, 19396, 19496, 19601, 19778, 19797, 20038, 20357, 20379, 20455, 20669, 20707, 20708, 20751, 20846, 20853, 20906, 21051, 21079, 21213, 21267, 21308, 21355, 21523, 21574, 21815, 21893, 21973, 22084, 22172, 22271, 22713, 22905, 23039, 23195, 23303, 23635, 23732, 23749, 23799, 23885, 23944, 24149, 24311, 24379, 24471, 24553, 24585, 24611, 24616, 24621, 24761, 24789, 24844, 24847, 24977, 25015, 25160, 25207, 25283, 25351, 25363, 25394, 25540, 25603, 25647, 25747, 25768, 25915, 25928, 26071, 26092, 26139, 26180, 26209, 26270, 26273, 26278, 26326, 26341, 26392, 26559, 26642, 26776, 26842 |

TABLE 5

| FFT Size (Number of Reserved Tones) | Tone Reservation Carrier Indices |
|---|---|
| 32K (288) | 793, 884, 899, 914, 1004, 1183, 1198, 1276, 1300, 1339, 1348, 1444, 1487, 1490, 1766, 1870, 1903, 1909, 1961, 2053, 2092, 2099, 2431, 2572, 2578, 2618, 2719, 2725, 2746, 2777, 2798, 2891, 2966, 2972, 3023, 3037, 3076, 3257, 3284, 3326, 3389, 3425, 3454, 3523, 3602, 3826, 3838, 3875, 3955, 4094, 4126, 4261, 4349, 4357, 4451, 4646, 4655, 4913, 5075, 5083, 5306, 5317, 5587, 5821, 6038, 6053, 6062, 6137, 6268, 6286, 6490, 6517, 6529, 6554, 6593, 6671, 6751, 6827, 6845, 7043, 7111, 7147, 7196, 7393, 7451, 7475, 7517, 7750, 7769, 7780, 8023, 8081, 8263, 8290, 8425, 8492, 8939, 8986, 9113, 9271, 9298, 9343, 9455, 9476, 9637, 9821, 9829, 9913, 9953, 9988, 10001, 10007, 10018, 10082, 10172, 10421, 10553, 10582, 10622, 10678, 10843, 10885, 10901, 11404, 11674, 11959, 12007, 12199, 12227, 12290, 12301, 12629, 12631, 12658, 12739, 12866, 12977, 13121, 13294, 13843, 13849, 13852, 13933, 14134, 14317, 14335, 14342, 14407, 14651, 14758, 14815, 14833, 14999, 15046, 15097, 15158, 15383, 15503, 15727, 15881, 16139, 16238, 16277, 16331, 16444, 16490, 16747, 16870, 16981, 17641, 17710, 17714, 17845, 18011, 18046, 18086, 18097, 18283, 18334, 18364, 18431, 18497, 18527, 18604, 18686, 18709, 18731, 18740, 18749, 18772, 18893, 19045, 19075, 19087, 19091, 19099, 19127, 19169, 19259, 19427, 19433, 19450, 19517, 19526, 19610, 19807, 19843, 19891, 20062, 20159, 20246, 20420, 20516, 20530, 20686, 20801, 20870, 20974, 21131, 21158, 21565, 21635, 21785, 21820, 21914, 21926, 22046, 22375, 22406, 22601, 22679, 22699, 22772, 22819, 22847, 22900, 22982, 22987, 23063, 23254, 23335, 23357, 23561, 23590, 23711, 23753, 23902, 24037, 24085, 24101, 24115, 24167, 24182, 24361, 24374, 24421, 24427, 24458, 24463, 24706, 24748, 24941, 25079, 25127, 25195, 25285, 25444, 25492, 25505, 25667, 25682, 25729, 25741, 25765, 25973, 26171, 26180, 26227, 26353, 26381, 26542, 26603, 26651, 26671, 26759, 26804, 26807, 26827 |

Meanwhile, for data symbols, carriers having carrier indices defined in Table 4 are reserved, and these index values are circular-shifted, thereby making it possible to define other carrier indices reserved for PAPR reduction. Here, an amount of circular-shifted index values may be determined by Dx and Dy.

Specifically, in a data symbol corresponding to an index l, a set $S_l$ of reserved carriers may be calculated based on following mathematical expression 2.

$$S_l = i_k + D_X^*(l \bmod D_Y), i_n \in S_0, 0 \leq n < N_{TR}, d_0 \leq l < d_{end} \quad (2)$$

Here, $S_0$ represents a set of reserved carriers corresponding to carrier indices defined in Table 4, $N_{TR}$ represents the number of cells reserved per an OFDM symbol, $d_0$ represents indices of a first OFDM symbol of a subframe, and $d_{end}$ represents an index of the last data symbol.

In the meantime, when a position where a preamble pilot is inserted in the preamble symbol and a position where a sub frame boundary pilot is inserted in the sub frame boundary symbols are defined based on pilot insertion pattern Dx=6, 8, 12, 16, 24, 32, the set of carriers to be reserved for the preamble symbols and the sub frame boundary symbols are as shown in Table 4.

In the meantime, other than the above, even in the case where a position where a preamble pilot is inserted in the preamble symbol and a position where a sub frame boundary pilot is inserted in the sub frame boundary symbols are defined based on pilot insertion pattern Dx=6, 12, 16, 24, 32, the set of carriers to be reserved for the preamble symbols and the sub frame boundary symbols are as described in Table 4.

In this case, when a position where a preamble pilot is inserted in the preamble symbol and a position where a sub frame boundary pilot is inserted in the sub frame boundary symbols are defined based Dx=3, 4, 8, the set of carriers to be reserved for the preamble symbols and the sub frame boundary symbols are as described in Table 5.

Figure 10:
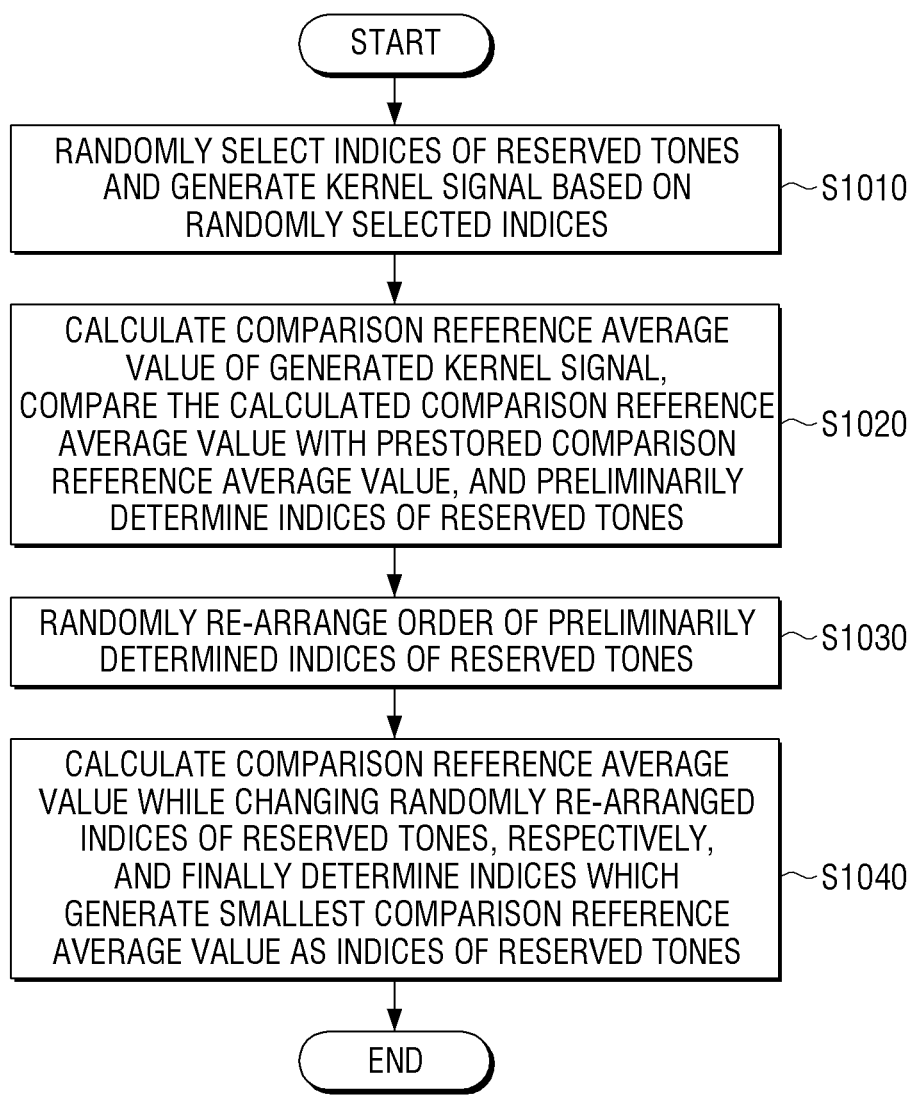
FIG. 10 is a flowchart illustrating the method for determining reserved tones according to an exemplary embodiment.

FIG. 10 is a flowchart illustrating a method of determining reserved tones according to an exemplary embodiment.

First, indices of reserved tones are randomly selected, and a kernel signal is generated based on the randomly selected indices (S1010).

Thereafter, a comparison reference average value of the generated kernel signal is calculated, the calculated comparison reference average value is compared with a pre-stored comparison reference average value, and indices of the reserved tones are preliminarily determined (S1020).

In addition, the order of the preliminarily determined indices of the reserved tones is randomly re-arranged (S1030), a comparison reference average value is calculated while changing each of the randomly re-arranged indices of the reserved tones, and indices which forms a basis of the smallest comparison reference average value are finally determined as indices of the reserved tones (S1040).

Here, in S1010, a kernel signal may be generated by randomly selecting carrier indices for the reserved tones among indices other than carrier indices into which a pilot is inserted, inserting 1 into carriers of the randomly selected indices, and performing IFFT.

The comparison reference average value of the kernel signal is an average value of amplitudes of peak signals which satisfy a predetermined condition, except a peak signal having the greatest amplitude, among a plurality of peak signals of the kernel signal generated based on the randomly selected indices for the reserved tones. The pre-determined condition may be a condition that the peak signals belong to a predetermined top range based on amplitude, except the peak signal having the greatest amplitude, among the plurality of peak signals of the kernel signal, and belong to another predetermined top range based on amplitude of a peak signal having the second-largest amplitude.

In S1020, a smaller comparison reference average value among the calculated comparison reference average value and the prestored comparison reference average value may be compared with a preset value, and indices for the kernel signal having a comparison reference average value smaller than the preset value may be preliminarily determined as indices of the reserved tones.

In addition, in S1040, the comparison reference average value may be calculated while sequentially changing the respective indices included in the randomly re-arranged indices of the reserved tones to indices, among indices of carries, where a pilot is not positioned and the preliminarily determined reserved tones are not positioned, and indices which generate the smallest comparison reference average value among the calculated comparison reference average values may be finally determined as indices of the reserved tones to be used for reduction of the PAPR of the data signal.

Meanwhile, the method for determining the carrier indices for the reserved tones is as described above.

Meanwhile, according to the present exemplary embodiments, the carrier indices defined as illustrated in Table 4 and Table 5 may be reserved for the reserved tones and a PAPR of a data signal may be reduced using the reserved carrier indices, so as to be transmitted to a receiver.

Figure 11:
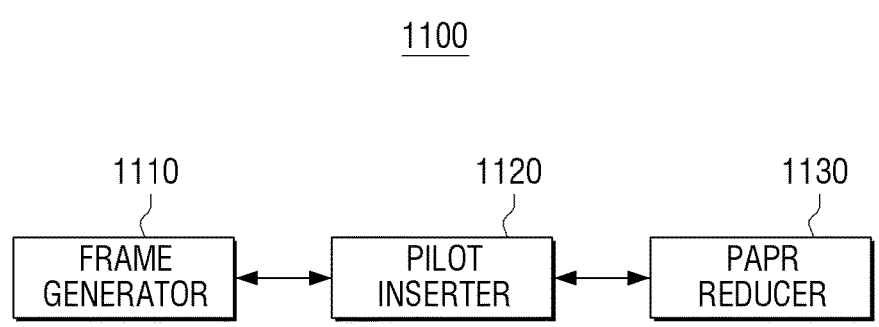
FIG. 11 is a block diagram illustrating a configuration of a transmitter according to an exemplary embodiment.

FIG. 11 is a block diagram illustrating a configuration of a transmitter according to an exemplary embodiment.

Referring to FIG. 11, a transmitter 1100 includes a frame generator 1110, a pilot inserter 1120, and a PAPR reducer 1130.

The frame generator 1110 generates a frame. Specifically, the frame generator may generate a frame including a plurality of OFDM symbols having an FFT size of 32K.

Here, the frame includes a preamble symbol, subframe boundary symbols, and data symbols, and a detailed structure thereof is as illustrated in FIG. 3.

In this case, the frame generator 1110 may insert an L1 signaling and broadcast data into the symbols by considering a position into which a pilot is to be inserted and positions of reserved tones.

Specifically, the frame is constituted by carriers in a frequency domain and an integer number of OFDM symbols in a time domain. In this case, the frame generator 1110 may insert the L1 signaling into carriers among a plurality of carriers of the preamble symbol in which the pilot and the reserved tones are not to be positioned, and may insert the broadcast data into carriers among a plurality of carriers of the subframe symbols in which the pilot and the reserved tones are not to be positioned. Meanwhile, the carriers into which the pilot is to be inserted and the carriers reserved for PAPR reduction are as described above.

The pilot inserter 1120 inserts the pilot into the frame. Specifically, the pilot inserter 1120 may insert the pilot into first carriers of the plurality of OFDM symbols, respectively.

In this case, the pilot may include a preamble pilot, a continual pilot, a subframe boundary pilot, a scattered pilot, and an edge pilot.

Accordingly, the pilot inserter 1120 may insert the preamble pilot and the continual pilot into the preamble symbol, may insert the subframe boundary pilot, the continual pilot, and the edge pilot into the subframe boundary symbols, and may insert the scattered pilot, the continual pilot, and the edge pilot into the data symbols.

Here, the pilot inserter 1120 may determine a position into which the pilot is to be inserted based on a specific pilot pattern (e.g., Dx and Dy) predefined in a system, or based on carrier indices predefined in the system. Meanwhile, the position into which the pilot is to be inserted depending on a pilot type is as described above.

The PAPR reducer 1130 performs PAPR reduction using reserved tones. Specifically, the PAPR reducer 1130 may insert a signal for reducing PAPR into second carriers reserved in at least one of the plurality of OFDM symbols into which the pilot is inserted. That is, the PAPR reducer 1130 may insert a tone reservation signal (e.g., cells which do not include data and L1 signaling) into carriers reserved for PAPR reduction, in order to reduce a PAPR of an output waveform.

To this end, the transmitter 1100 may further include an IFFT unit (not illustrated) for performing IFFT on the data and the frame into which the pilot is inserted in a frequency domain to generate a signal of a time domain.

In this case, the PAPR reducer 1130 may use a gradient algorithm, as described above with reference to FIG. 1. However, this is merely one example, and the PAPR reducer 1130 may use various algorithms according to a tone reservation method.

Meanwhile, the second reserved carriers may be defined as illustrated in Table 4 and Table 5.

For example, the second reserved carriers have carrier indices defined as in Table 4, when a position in a preamble symbol into which a preamble pilot is to be inserted and a position in subframe boundary symbols into which a subframe boundary pilot is to be inserted are defined based on a pilot insertion pattern (Dx=6, 8, 12, 16, 24, 32), and an edge pilot is to be inserted into a first carrier and a last carrier in each of the subframe boundary symbols.

In addition, the second reserved carriers have carrier indices defined as illustrated in Table 4 in data symbols, in a case in which a position into which a scattered pilot is to be inserted is defined based on a pilot insertion pattern (Dx=3, 4, 6, 8, 12, 16, 24, 32 and Dy=2, 4), and an edge pilot is to be inserted into a first carrier and a last carrier in each of the data symbols.

Meanwhile, the second reserved carriers have carrier indices defined as in Table 5, when a position in a preamble symbol into which a preamble pilot is to be inserted and a position in subframe boundary symbols into which a subframe boundary pilot is to be inserted are defined based on a pilot insertion pattern (Dx=3 and 4), and an edge pilot is to be inserted into a first carrier and a last carrier in each of the subframe boundary symbols.

Here, Dx is a difference of carrier indices between adjacent carriers into which a pilot is to be inserted, and Dy is a difference of symbol indices between successive pilots on a specific carrier.

As such, the transmitter 1100 may perform PAPR reduction using the reserved tones and may transmit a signal of which a PAPR is reduced to a receiver (not illustrated).

Meanwhile, the transmitter 1100 may further include components other than the components illustrated in FIG. 11.

For example, the transmitter 1100 may further include components for encoding and modulating the data and the L1 signaling.

Specifically, the transmitter 110 may further include an encoder (not illustrated) for encoding the broadcast data and the L1 signaling, a bit interleaver (not illustrated) for interleaving the encoded broadcast data and L1 signaling, a constellation mapper (not illustrated) for mapping the interleaved broadcast data and L1 signaling to constellation to generate a modulated symbol, and a time interleaver (not illustrated) and a frequency interleaver (not illustrated) for interleaving the broadcast data and the L1 signaling in a time domain and a frequency domain, respectively.

In addition, the transmitter 1100 may further include an IFFT unit (not illustrated) which performs IFFT for the broadcast data, the L1 signaling, and the frame into which the pilot is inserted, and may further include a guard interval inserter (not illustrated) for inserting a guard interval into a signal that the PAPR reduction is performed, a bootstrap unit (not illustrated) for inserting information on the L1 signaling into bootstrap symbols after the guard interval is inserted, and a transmitting unit (not illustrated) for up-converting a signal into which the bootstrap symbols are inserted into a signal of a radio frequency (RF) band and transmitting the up-converted signal to a receiving side.

Figure 12:
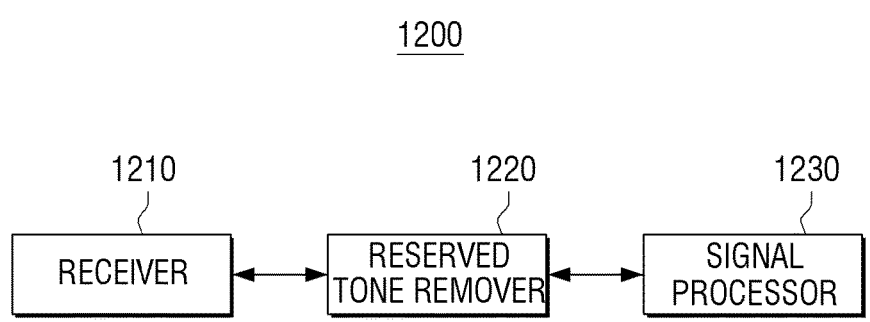
FIG. 12 is a block diagram illustrating a configuration of a receiver according to an exemplary embodiment.

FIG. 12 is a block diagram illustrating a configuration of a receiver according to an exemplary embodiment.

Referring to FIG. 12, a receiver 1200 includes a receiving unit 1210, a reserved tone remover 1220, and a signal processor 1230.

The receiving unit 1210 receives a frame transmitted from the transmitter 1100. Specifically, the receiving unit 1210 may synchronize the frame, may receive the signal through an allocated frequency band, and may down-convert a received RF band signal into a baseband signal. In addition, the receiving unit 1210 may perform a Fast Fourier Transform (FFT) to restore symbols mapped to the frequency domain. That is, the receiving unit 1210 may restore a plurality of OFDM symbols mapped to the frame.

The reserved tone remover 1220 removes reserved tones from a plurality of OFDM symbols constituting the frame.

Specifically, the reserved tone remover 1220 determines positions of the reserved tones in the symbols and removes the reserved tones from the corresponding positions. Accordingly, the reserved tone remover 1220 may remove the reserved tones and may extract only data.

Here, information on the carrier indices allocated for the reserved tones may be prestored in the receiver 1200, or may be provided from the transmitter 1100. Meanwhile, the carrier indices allocated for the reserved tones are as illustrated in the Table 4 and Table 5 described above.

The signal processor 1230 processes a plurality of OFDM symbols from which the reserved tones are removed. That is, the signal processor 1230 may process data received as the reserved tones are removed.

Specifically, the signal processor 1230 may deinterleave the broadcast data and the L1 signaling in the frequency domain and the time domain using a frequency deinterleaver (not illustrated) and a time deinterleaver (not illustrated), may extract the signal mapped to the constellation using a constellation demapper (not illustrated), may deinterleave and decode the broadcast data and the L1 signaling using a bit deinterleaver (not illustrated) and a decoder (not illustrated), and may restore the broadcast data and the L1 signaling. In this case, because the L1 signaling includes signaling information on the broadcast data, the L1 signaling may be used upon restoring the broadcast data.

Figure 13:
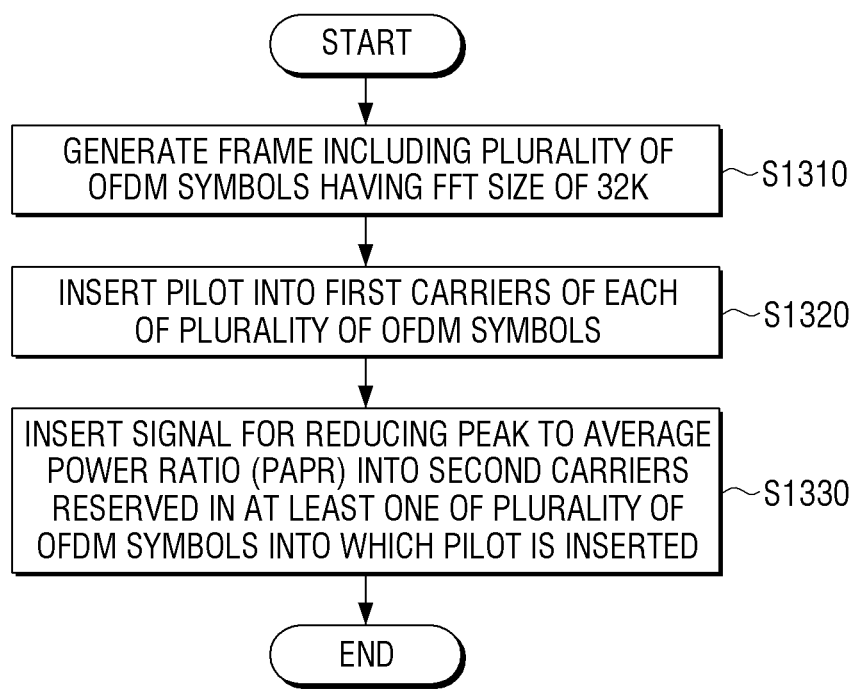
FIG. 13 is a flowchart illustrating a method in which the transmitter reduces PAPR using reserved tones according to an exemplary embodiment.

FIG. 13 is a flowchart illustrating a method for inserting a reserved tone signal according to an exemplary embodiment of the present disclosure.

First, a frame including a plurality of OFDM symbols having an FFT size of 32K is generated (S1310).

Thereafter, a pilot is inserted into first carriers of the plurality of OFDM symbols, respectively (S1320).

In addition, a signal for reducing a PAPR is inserted into second carriers reserved in at least one of the plurality of OFDM symbols into which the pilot is inserted (S1330).

Here, the frame includes the preamble symbol, the subframe boundary symbols, and the data symbols.

In this case, the second reserved carriers may have the carrier indices defined as in Table 4 and Table 5.

The second reserved carriers have the carrier indices defined as in Table 4, when a position in the preamble symbol into which a preamble pilot is to be inserted and a position in the subframe boundary symbols into which a subframe boundary pilot is to be inserted are defined based on a pilot insertion pattern (Dx=6, 8, 12, 16, 24, 32), and an edge pilot is to be inserted into a first carrier and a last carrier in each of the subframe boundary symbols. In addition, the second carriers reserved have the carrier indices defined as illustrated in Table 4 in the data symbols, in the case where a position into which a scattered pilot is to be inserted is determined based on a pilot insertion pattern (Dx=3, 4, 6, 8, 12, 16, 24, 32 and Dy=2, 4), and an edge pilot is to be inserted into a first carrier and a last carrier in each of the data symbols.

In addition, the second reserved carriers have the carrier indices defined as in Table 5, when a position in the preamble symbol into which a preamble pilot is to be inserted and a position in subframe boundary symbols into which a subframe boundary pilot is to be inserted are defined based on Dx=3 and 4, and an edge pilot is to be inserted into a first carrier and a last carrier in each of the subframe boundary symbols.

Here, Dx is a difference of carrier indices between adjacent carriers into which the pilot is to be inserted, and Dy is a difference of symbol indices between successive pilots on a specific carrier.

Meanwhile, a non-transitory computer readable medium having a program stored therein may be provided, wherein the program sequentially performs the method for determining reserved tones according to the exemplary embodiments.

The non-transitory computer readable medium does not mean a medium storing data for a short period such as a register, a cache, a memory, or the like, but means a machine-readable medium semi-permanently storing the data. Specifically, various applications or programs described above may be stored and provided in the non-transitory computer readable medium such as a compact disc (CD), a digital versatile disk (DVD), a hard disk, a Blu-ray disk, a universal serial bus (USB), a memory card, a read-only memory (ROM), or the like.

In addition, although a bus is not illustrated in the block diagram illustrating the transmitter and the receiver, communications between the respective components in the transmitter and the receiver may also be performed via the bus. In addition, the respective apparatuses may further include a processor such as a central processing unit (CPU), a microprocessor, or the like which performs various operations described above, and may further include a memory for performing various operation described above.

A term "module", "unit" "part", or the like as represented by a block in FIGS. 1, 11 and 12, in the exemplary embodiments, is a term for referring to the component performing at least one function or operation, and such component may be implemented in hardware or software or a combination of hardware and software. In addition, a plurality of "modules", "units", "parts", or the like may be integrated into at least one module or chip and may be implemented in or by at least one processor (not illustrated) such as a microprocessor, except for a case in which they need to be each implemented in individual specific hardware.

Hereinabove, although the exemplary embodiments have been shown and described, it should be understood that the inventive concept is not limited to the disclosed embodiments and may be variously changed without departing from the spirit and the scope of the inventive concept. Therefore, the exemplary embodiments should be construed as including all the changes, equivalents, and substitutions included in the spirit and scope of the present disclosure.

What is claimed is:

1. A receiving apparatus comprising:
a receiver configured to receive a frame comprising an orthogonal frequency division multiplexing (OFDM) symbol from a transmitting apparatus; and
a processor configured to process the received frame based on positions of reserved tones for a peak to average power ratio (PAPR) reduction,
wherein a fast fourier transform (FFT) size of the OFDM symbol is 32K, and
wherein the positions of reserved tones are represented by a set of carriers having carrier indices listed below:

| FFT Size (Number of Reserved Tones) | Carrier Indices |
|---|---|
| 32K (288) | 803, 805, 811, 901, 1001, 1027, 1245, 1258, 1318, 1478, 1507, 1509, 1556, 1577, 1655, 1742, 1978, 2001, 2056, 2110, 2164, 2227, 2305, 2356, 2408, 2522, 2563, 2780, 2805, 2879, 3010, 3019, 3128, 3389, 3649, 3730, 3873, 4027, 4066, 4087, 4181, 4246, 4259, 4364, 4406, 4515, 4690, 4773, 4893, 4916, 4941, 4951, 4965, 5165, 5222, 5416, 5638, 5687, 5729, 5930, 5997, 6005, 6161, 6218, 6292, 6344, 6370, 6386, 6505, 6974, 7079, 7114, 7275, 7334, 7665, 7765, 7868, 7917, 7966, 8023, 8055, 8089, 8091, 8191, 8374, 8495, 8651, 8690, 8755, 8821, 9139, 9189, 9274, 9561, 9611, 9692, 9711, 9782, 9873, 9964, 10011, 10209, 10575, 10601, 10623, 10690, 10967, 11045, 11083, 11084, 11090, 11128, 11153, 11530, 11737, 11829, 11903, 11907, 11930, 11942, 12356, 12429, 12484, 12547, 12562, 12605, 12767, 12863, 13019, 13052, 13053, 13167, 13210, 13244, 13259, 13342, 13370, 13384, 13447, 13694, 13918, 14002, 14077, 14111, 14216, 14243, 14270, 14450, 14451, 14456, 14479, 14653, 14692, 14827, 14865, 14871, 14908, 15215, 15227, 15284, 15313, 15333, 15537, 15643, 15754, 15789, 16065, 16209, 16213, 16217, 16259, 16367, 16369, 16646, 16780, 16906, 16946, 17012, 17167, 17192, 17325, 17414, 17629, 17687, 17746, 17788, 17833, 17885, 17913, 18067, 18089, 18316, 18337, 18370, 18376, 18440, 18550, 18680, 18910, 18937, 19047, 19052, 19117, 19383, 19396, 19496, 19601, 19778, 19797, 20038, 20357, 20379, 20455, 20669, 20707, 20708, 20751, 20846, 20853, 20906, |

-continued

| FFT Size (Number of Reserved Tones) | Carrier Indices |
|---|---|
| | 21051, 21079, 21213, 21267, 21308, 21355, 21523, 21574, 21815, 21893, 21973, 22084, 22172, 22271, 22713, 22905, 23039, 23195, 23303, 23635, 23732, 23749, 23799, 23885, 23944, 24149, 24311, 24379, 24471, 24553, 24585, 24611, 24616, 24621, 24761, 24789, 24844, 24847, 24977, 25015, 25160, 25207, 25283, 25351, 25363, 25394, 25540, 25603, 25647, 25747, 25768, 25915, 25928, 26071, 26092, 26139, 26180, 26209, 26270, 26273, 26278, 26326, 26341, 26392, 26559, 26642, 26776, 26842. |

2. The receiving apparatus as claimed in claim 1, wherein the OFDM symbol is one of a plurality of OFDM symbols included in a frame, and
wherein the frame includes a preamble symbol, subframe boundary symbols, and data symbols.

3. The receiving apparatus as claimed in claim 2, wherein the carrier indices of the set of carriers comprise carrier indices, when a position in the preamble symbol into which a preamble pilot is to be inserted and a position in the subframe boundary symbols into which a subframe boundary pilot is to be inserted are defined based on a pilot insertion pattern, and an edge pilot is to be inserted into a first carrier and a last carrier in each of the subframe boundary symbols.

4. The receiving apparatus as claimed in claim 3, wherein the pilot insertion pattern is determined based on Dx=6, 12, 16, 24, 32, and
wherein Dx is a difference of carrier indices between adjacent carriers into which a pilot is to be inserted.

5. The receiving apparatus as claimed in claim 2, wherein the carrier indices of the set of carriers comprise carrier indices, when a position in the data symbols into which a scattered pilot is to be inserted are defined based on a pilot insertion pattern, and an edge pilot is to be inserted into a first carrier and a last carrier in each of the data symbols.

6. The receiving apparatus as claimed in claim 5, wherein the pilot insertion pattern is determined based Dx=3, 4, 6, 8, 12, 16, 24, 32, and
wherein Dx is a difference of carrier indices between adjacent carriers into which a pilot is to be inserted.

7. The receiving apparatus as claimed in claim 5, wherein the pilot insertion pattern is determined based Dy=2, 4, and
wherein Dy is a difference of symbol indices between successive pilots on a specific carrier.

8. The receiving apparatus as claimed in claim 1, wherein the OFDM symbol comprises a plurality of symbols comprising a preamble symbol, subframe boundary symbols, and data symbols,
wherein the carrier indices are determined based on a pattern of pilots inserted into the plurality of symbols.

9. A receiving method comprising:
receiving a frame comprising an orthogonal frequency division multiplexing (OFDM) symbol from a transmitting apparatus; and
processing the received frame based on positions of reserved tones for a peak to average power ratio (PAPR) reduction,
wherein a fast fourier transform (FFT) size of the OFDM symbol is 32K, and
wherein the positions of reserved tones are represented by a set of carriers having carrier indices listed below:

| FFT Size (Number of Reserved Tones) | Carrier Indices |
|---|---|
| 32K (288) | 803, 805, 811, 901, 1001, 1027, 1245, 1258, 1318, 1478, 1507, 1509, 1556, 1577, 1655, 1742, 1978, 2001, 2056, 2110, 2164, 2227, 2305, 2356, 2408, 2522, 2563, 2780, 2805, 2879, 3010, 3019, 3128, 3389, 3649, 3730, 3873, 4027, 4066, 4087, 4181, 4246, 4259, 4364, 4406, 4515, 4690, 4773, 4893, 4916, 4941, 4951, 4965, 5165, 5222, 5416, 5638, 5687, 5729, 5930, 5997, 6005, 6161, 6218, 6292, 6344, 6370, 6386, 6505, 6974, 7079, 7114, 7275, 7334, 7665, 7765, 7868, 7917, 7966, 8023, 8055, 8089, 8091, 8191, 8374, 8495, 8651, 8690, 8755, 8821, 9139, 9189, 9274, 9561, 9611, 9692, 9711, 9782, 9873, 9964, 10011, 10209, 10575, 10601, 10623, 10690, 10967, 11045, 11083, 11084, 11090, 11128, 11153, 11530, 11737, 11829, 11903, 11907, 11930, 11942, 12356, 12429, 12484, 12547, 12562, 12605, 12767, 12863, 13019, 13052, 13053, 13167, 13210, 13244, 13259, 13342, 13370, 13384, 13447, 13694, 13918, 14002, 14077, 14111, 14216, 14243, 14270, 14450, 14451, 14456, 14479, 14653, 14692, 14827, 14865, 14871, 14908, 15215, 15227, 15284, 15313, 15333, 15537, 15643, 15754, 15789, 16065, 16209, 16213, 16217, 16259, 16367, 16369, 16646, 16780, 16906, 16946, 17012, 17167, 17192, 17325, 17414, 17629, 17687, 17746, 17788, 17833, 17885, 17913, 18067, 18089, 18316, 18337, 18370, 18376, 18440, 18550, 18680, 18910, 18937, 19047, 19052, 19117, 19383, 19396, 19496, 19601, 19778, 19797, 20038, 20357, 20379, 20455, 20669, 20707, 20708, 20751, 20846, 20853, 20906, 21051, 21079, 21213, 21267, 21308, 21355, 21523, 21574, 21815, 21893, 21973, 22084, 22172, 22271, 22713, 22905, 23039, 23195, 23303, 23635, 23732, 23749, 23799, 23885, 23944, 24149, 24311, 24379, 24471, 24553, 24585, 24611, 24616, 24621, 24761, 24789, 24844, 24847, 24977, 25015, 25160, 25207, 25283, 25351, 25363, 25394, 25540, 25603, 25647, 25747, 25768, 25915, 25928, 26071, 26092, 26139, 26180, 26209, 26270, 26273, 26278, 26326, 26341, 26392, 26559, 26642, 26776, 26842. |

10. The receiving method as claimed in claim 9, wherein the OFDM symbol is one of a plurality of OFDM symbols included in a frame, and wherein the frame includes a preamble symbol, subframe boundary symbols, and data symbols.

11. The receiving method as claimed in claim 10, wherein the carrier indices of the set of carriers comprise carrier indices, when a position in the preamble symbol into which a preamble pilot is to be inserted and a position in the subframe boundary symbols into which a subframe boundary pilot is to be inserted are defined based on a pilot insertion pattern, and an edge pilot is to be inserted into a first carrier and a last carrier in each of the subframe boundary symbols.

12. The receiving method as claimed in claim 11, wherein the pilot insertion pattern is determined based on Dx=6, 12, 16, 24, 32, and
wherein Dx is a difference of carrier indices between adjacent carriers into which a pilot is to be inserted.

13. The receiving method as claimed in claim 10, wherein the carrier indices of the set of carriers comprise carrier indices, when a position in the data symbols into which a scattered pilot is to be inserted are defined based on a pilot insertion pattern, and an edge pilot is to be inserted into a first carrier and a last carrier in each of the data symbols.

14. The receiving method as claimed in claim 13, wherein the pilot insertion pattern is determined based Dx=3, 4, 6, 8, 12, 16, 24, 32, and
wherein Dx is a difference of carrier indices between adjacent carriers into which a pilot is to be inserted.

15. The receiving method as claimed in claim 13, wherein the pilot insertion pattern is determined based Dy=2, 4, and
wherein Dy is a difference of symbol indices between successive pilots on a specific carrier.

16. The receiving method as claimed in claim 9, wherein the OFDM symbol comprises a plurality of symbols comprising a preamble symbol, subframe boundary symbols, and data symbols,
wherein the carrier indices are determined based on a pattern of pilots inserted into the plurality of symbols.

* * * * *